(12) United States Patent
Claussen et al.

(10) Patent No.: US 8,285,293 B2
(45) Date of Patent: Oct. 9, 2012

(54) FEMTOCELL BASE STATION, AND A METHOD OF RADIO COMMUNICATION IN A NETWORK COMPRISING A FEMTOCELL BASE STATION

(75) Inventors: Holger Claussen, Co. Kildare (IE); Irwin O Kennedy, Londonderry (IE)

(73) Assignee: Alcatel Lucent, Paris (FR)

( * ) Notice: Subject to any disclaimer, the term of this patent is extended or adjusted under 35 U.S.C. 154(b) by 308 days.

(21) Appl. No.: 12/621,196

(22) Filed: Nov. 18, 2009

(65) Prior Publication Data

US 2010/0130222 A1    May 27, 2010

(30) Foreign Application Priority Data

Nov. 21, 2008   (EP) ..................................... 08291103

(51) Int. Cl.
*H04W 40/00* (2009.01)

(52) U.S. Cl. ........................................ 455/446; 455/444

(58) Field of Classification Search .................. 455/446, 455/444, 435.1, 435.2, 136, 450, 509, 67.13, 455/426.2

See application file for complete search history.

(56) References Cited

U.S. PATENT DOCUMENTS 5,884,145 A    3/1999  Haartsen

2009/0042593 A1*   2/2009  Yavuz et al. .................. 455/522
2009/0325583 A1*  12/2009  Burgess et al. ............... 455/444
2010/0120437 A1*   5/2010  Foster et al. .................. 455/444

FOREIGN PATENT DOCUMENTS

WO    WO 2004/008794 A2    1/2004

OTHER PUBLICATIONS

"3$^{rd}$ Generation Partnership Project; Technical Specification Group Radio Access Networks; 3G Home NodeB Study Item Technical Report (Release 8)," 3GPP TR 25.820 V8.2.0, XP002525355, pp. 1-40, (Sep. 2008).
European Search Report.

* cited by examiner

*Primary Examiner* — Dwayne Bost
*Assistant Examiner* — Kenneth Corbin
(74) *Attorney, Agent, or Firm* — Fay Sharpe LLP

(57) ABSTRACT

A method is provided of radio communication in a radio communications network comprising a macrocell base station and a femtocell base station. The method comprises the femtocell base station: transmitting in a first radio frequency band that is allocated to the macrocell, and detecting that a user terminal that is connected to the macrocell base station is in the femtocell. In response to said detecting the user terminal as being in the femtocell, the femtocell base station ceases to use that frequency band at least in the region in which the user terminal is located so as to avoid unacceptable interference to the user terminal.

20 Claims, 4 Drawing Sheets

Detection of uplink interference level at
Femtocell base station to detect active macrocell UE.

FEMTOCELL BASE STATION, AND A METHOD OF RADIO COMMUNICATION IN A NETWORK COMPRISING A FEMTOCELL BASE STATION

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, femtocells, or picocells, but we use the term femtocells generically for cells that are smaller than macrocells. One way to establish a femtocell is to provide a femtocell base station (sometimes referred to in this field as a femto) that operates within a relatively limited range, for example, within the coverage area of a macrocell. One example of use of a femtocell base station is to provide wireless communication coverage within a building.

The femtocell base station is of a relatively low transmit power and hence each femtocell is small compared to a macrocell. A femtocell is intended to provide localised services and high bandwidth to a fairly low number of end users.

Femtocell base stations typically use broadband Internet Protocol connections, such as Digital Subscriber Line (DSL) or cable, as "backhaul". Femtocell base stations may be connected via femtocell base station gateways to, for example, a Universal Mobile Telecommunications System (UMTS) core network, for example each gateway may be connected to a UMTS Mobile Switching Centre (MSC) and hence a Signalling Gateway Support Node (SGSN).

Femtocell base stations are intended primarily for users belonging to a particular home or office. Femtocell base stations may be private ("closed") access or public ("open") access. In private access femtocell base stations, access is restricted to only registered users, for example family members or particular groups of employees. In public access femtocell base stations, other users may also use the femtocell base station, subject to certain restrictions to protect the Quality of Service received by registered users.

To increase the data capacity of femtocells, it has been found desirable to increase the radio frequency spectrum that each femtocell base station can use. In the uplink direction, in other words from user terminal to base station, for a femtocell residing within the macrocell, it is known that frequency bands used by the macrocell base station may also be used by the femtocell base station provided the level of interference to the macrocell base station is acceptable. Such frequency band "reuse" is sometimes known as co-channel deployment.

In this situation, unacceptable radio interference to the macrocell base station is avoided by appropriately controlling the uplink power of the user terminal to the femtocell base station. Such an approach is described in the paper by H. Claussen entitled "Performance of macro- and co-channel femtocells in a hierarchical cell structure", The 18$^{th}$ IEEE International Symposium on Personal, Indoor and Mobile Radio Communications (PIMRC'07), 2007.

For the downlink, that is in the direction of radio transmission out from the femtocell base station into the femtocell coverage area, most known approaches involving frequency band "reuse" require the femtocell base station to be public access. This is because if a femtocell base station is configured for private access, an unacceptable situation would arise that a user terminal connected to the macrocell base station but receiving unacceptably high interference from the femtocell base station, would not be permitted to handover to the femtocell base station because the user terminal is not one of the predefined permitted users of the femtocell base station. Although public access both avoids this problem and generally improves the spectral efficiency, in other words the level of usage of limited frequency spectrum, femtocell base stations that are private access have advantages, for example of security, and so are attractive.

A known approach involving frequency band "reuse" downlink by a femtocell base station within a macrocell, that is applicable where the femtocell base station is private access, is for the femtocell base station to use, downlink, the same frequency band as the macrocell, but with very low power. However, this usually provides indoor radio coverage that is patchy, resulting in "dead zones" around femtocell base stations. In these dead zones, user terminals that are not registered with the femtocell base station are unable to make or receive any calls because attempted connections with the macrocell base station experience unacceptably high interference from the femtocell base station.

International (P.C.T.) Patent Publication WO2004/008794 and U.S. U.S. Pat. No. 5,884,145 provide background.

SUMMARY OF THE INVENTION

The reader is referred to the appended independent claims. Some preferred features are laid out in the dependent claims.

An example of the present invention is a method of radio communication in a radio communications network comprising a macrocell base station and a femtocell base station, the method comprising:

the femtocell base station transmitting in a first radio frequency band that is allocated to the macrocell;

detecting that a user terminal that is connected to the macrocell base station is in the femtocell; and the femtocell base station in response to said detecting that the user terminal is in the femtocell, ceasing to use that frequency band at least in the region in which the user terminal is located so as to avoid unacceptable interference to the user terminal, in which the femtocell base station undertakes said detecting that the user terminal that is connected to the macrocell base station is in the femtocell.

Preferred embodiments enable use by a femtocell base station in the downlink direction of a frequency band used by a macrocell within which the femtocell base station resides; and are applicable where the femtocell base station is private access type.

In preferred embodiments, such frequency band use by the femtocell base station, which is opportunistic in that it occurs when made possible due to no user connected to the macrocell being present in the femtocell, increases the femtocell call capacity without requiring changes in the macrocell network or causing degradation of service to macrocell users. Capacity is increased due to the increase in the number of frequency bands that the femtocell base station can use when a macrocell user is not present. Accordingly, the data transmission rate of the femtocell base station is increased. For example, in a network using one frequency band for femtocell transmission and one frequency band for macrocell transmission, the use by the femtocell base station of the frequency band of the macrocell can double the achievable data rate of downlink transmission from the femtocell base station.

BRIEF DESCRIPTION OF THE DRAWINGS

Embodiments of the present invention will now be described by way of example and with reference to the drawings, in which.

DETAILED DESCRIPTION

Figure 1:
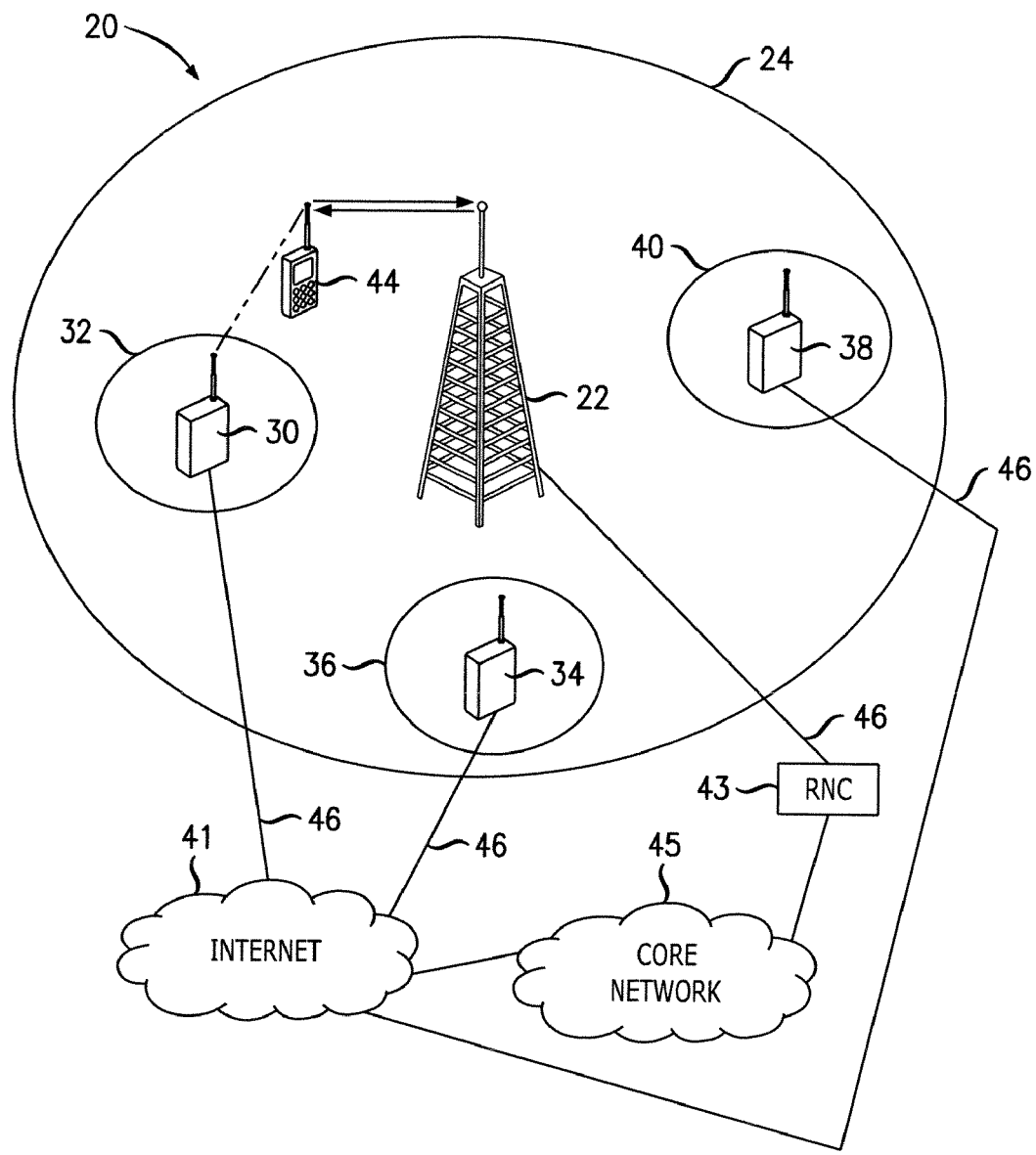
FIG. 1 is a diagram illustrating a network for wireless communications according to a first embodiment of the invention.

As shown in FIG. 1, in one communication network 20, there are two types of base stations (often denoted BS or BSs): macrocell base stations and femtocell base stations. One macrocell base station 22 for wireless telecommunications is shown for simplicity in FIG. 1. The macrocell base station 22 has a radio coverage area 24 that is often referred to as a macrocell. The geographic extent of the macrocell 24 depends on the capabilities of the macrocell base station 22 and the surrounding geography.

Within the macrocell 24, a femtocell base station 30 provides wireless communications within a femtocell 32. A femtocell is a radio coverage area. The radio coverage area of the femtocell 30 is much less than that of the macrocell 24. For example, the femtocell 32 corresponds in size to a user's office or home, a size of the order of tens of meters.

Another femtocell base station 34 provides wireless coverage within a femtocell 36. A further femtocell 38 provides wireless coverage within a femtocell 40.

As shown in FIG. 1, the femtocell base stations 30,34,38 are connected via broadband Internet Protocol connections ("backhaul") 46 to the Internet 41. The macrocell base station 22 is connected via a radio network controller, RNC, 43 to the macrocell core network 45, which in this example is a Universal Mobile Telecommunications System (UMTS) core network.

It is possible for a mobile terminal 44 within the macrocell 24 to communicate with the macrocell base station 22 in known manner The femtocell 32 is private access, in that access is restricted only to registered users, for example family members or particular groups of employees. When the mobile terminal 44 enters into a femtocell 32 for which the mobile terminal is not registered for communications with the femtocell base station 30, accordingly, it is not possible to handover the connection with the user 44 terminal from the macrocell base station 22 to the femtocell base station 30.

Femtocell Base Stations

Femtocell base stations 30,34,38 are user-deployed, often denoted plug-and-play. Upon deployment, the femtocell base stations automatically integrate themselves into the existing ("underlay") of a network of macrocells. The femtocell base stations are autoconfiguring in the sense of being provided an initial set of parameter values enabling operation, for example transmission signal strengths, scrambling codes and power limits. Also they are self-optimising, in the sense of dynamically adjusting to received data such as of received signal strength and interference level, for example to optimise transmit signal strength and update soft/softer handover neighbour lists.

Figure 2:
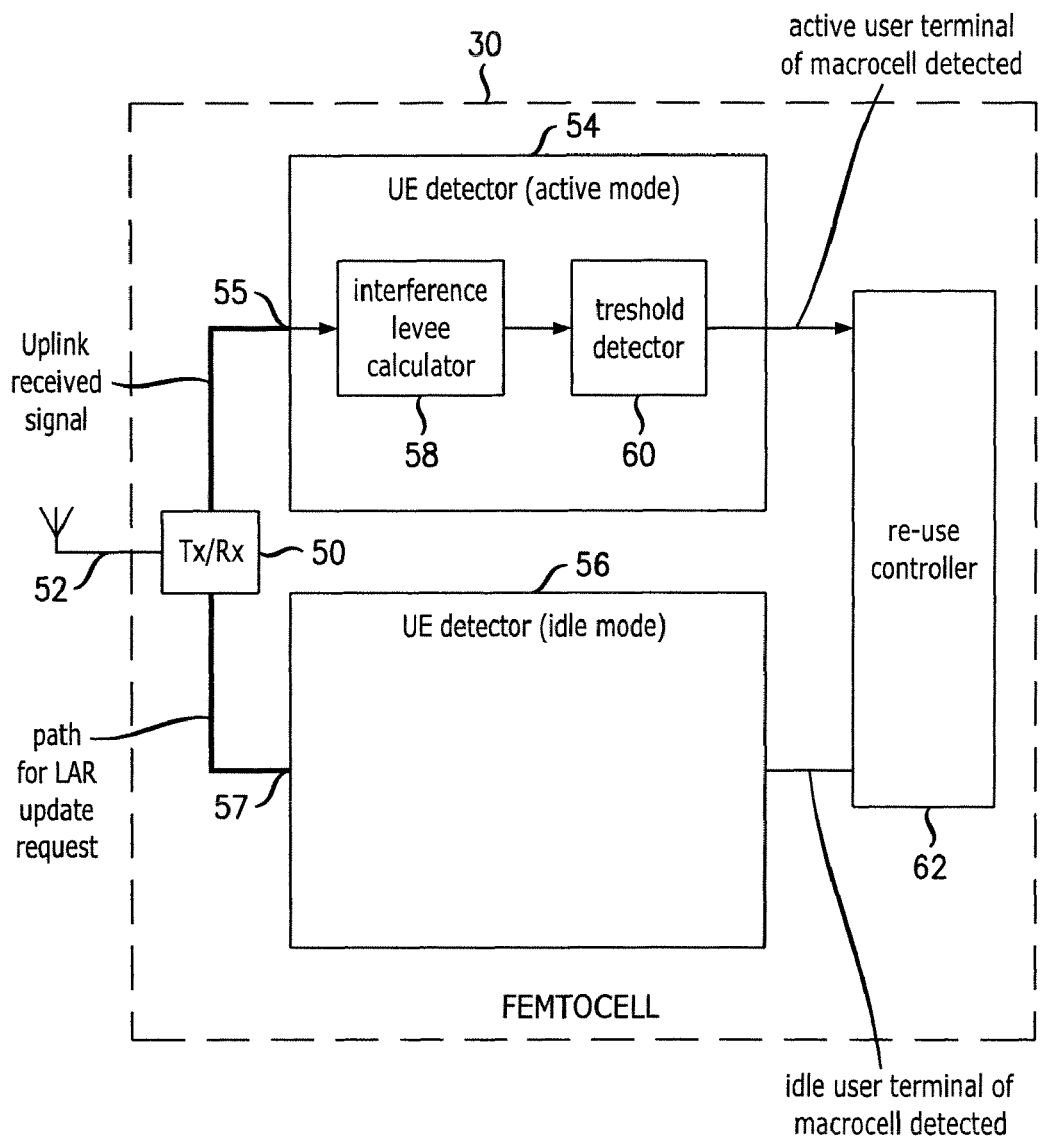
FIG. 2 is a diagram illustrating, in terms of relevant functional blocks, one of the femtocell base stations shown in FIG. 1.

As shown in FIG. 2, the femtocell base station 30 includes a transmitter-receiver (Tx/Rx) 50, an antenna 52, a first detector 54, a second detector 56, and a reuse controller 62. The transmitter-receiver 50 is connected to the antenna 52 and to both the first detector 54 and the second detector 56 at respective input ports 55,57 of the detectors 54,56. The first detector 54 is to detect a user terminal connected to a macrocell in active mode. The second detector 56 is to detect a user terminal connected to a macrocell in idle mode.

The first detector 54 includes an interference level calculator 58 and a threshold detector 60 that are explained further below.

Both the first detector 54 and the second detector 56 are connected to the reuse controller 62 which is explained in more detail below. The reuse controller 62 is a downlink frequency band reuse controller in the sense of controlling the extent to which a frequency band used in the macrocell is also used as a downlink transmission band by the femtocell base station.

Frequency Band "Reuse"

The femtocell base station automatically detects whether a downlink frequency band of the macrocell is currently in use by a user terminal 44 connected to the macrocell base station 22 and in the proximity of the femtocell base station 30. That use of the downlink frequency band may be when the user terminal 44 is connected in active mode or in idle mode. If the downlink frequency band is in use by the macrocell base station 22, it is considered that operation of the user terminal 44 would be unacceptably affected if the femtocell base station 30 were to use the same downlink frequency band, for example to another user terminal that is a registered user of the femtocell base station. Accordingly, such "reuse" i.e. use of that downlink frequency band by the femtocell base station 30, is avoided, at least in the region in which the user terminal 44 currently resides. This is explained in more detail below.

Active mode is when a user terminal is in an active call connection to the macrocell base station, for example in a voice call or data service session. Idle mode is when a user terminal is known by the macrocell base station to be in the coverage area of the macrocell due to signalling messages such paging messages and responses, but no call connection is made enabling transfer of user's voice or data. Different methods are used to detect a user terminal connected to the macrocell dependent on whether the user terminal is in active mode or idle mode, as explained below.

Detection of a User Terminal in Active Mode Connection

Figure 3:
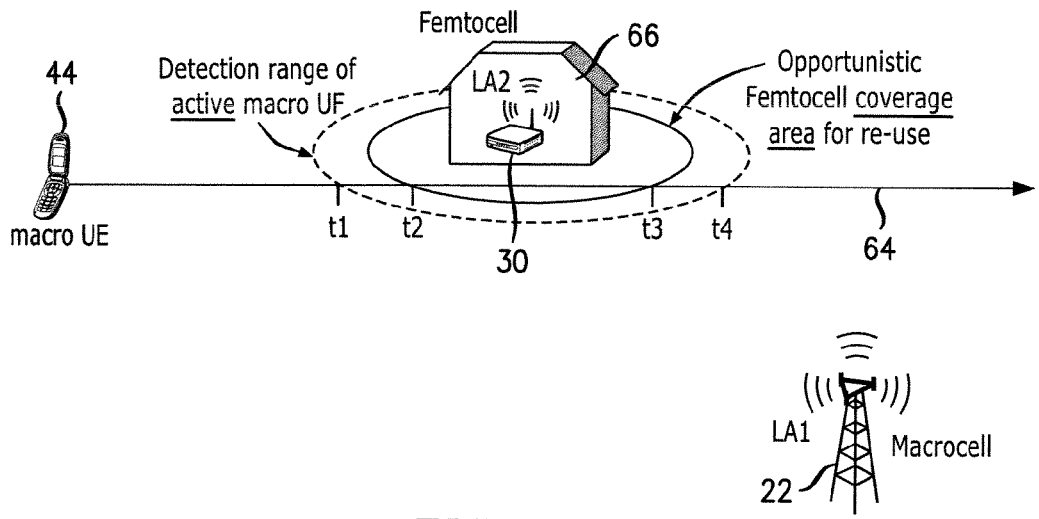
FIG. 3 is a diagram illustrating a scenario in which a user terminal that is in active mode connection with a macrocell base station approaches the femtocell base station shown in FIG. 2.

As shown in FIG. 3, consider the scenario of the user terminal 44 being in active mode connection to the macrocell base station 22 and moving along a road 64 passed a building 66 within which the femtocell base station 30 is located. The user terminal moves into the femtocell 32 for a time but is not a permitted user terminal of the femtocell 32 which is of private access type. As the user terminal 44 moves along the road 64, the femtocell base station 30 experiences radio interference due to active mode communications between the user terminal and the macrocell base station. This interference affects the receive, in other words uplink, frequency band of the femtocell base station.

Referring back to FIG. 2, the interference level calculator 58 determines the level of interference in the uplink frequency band received by the femtocell base station and provides that information to the threshold detector 60. The threshold detector determines whether or not a predetermined threshold Th is exceeded; if the threshold is exceeded, a signal is send to the reuse controller 62 which, in this example, responds by ceasing use downlink of that frequency band by the femtocell base station.

Figure 4:
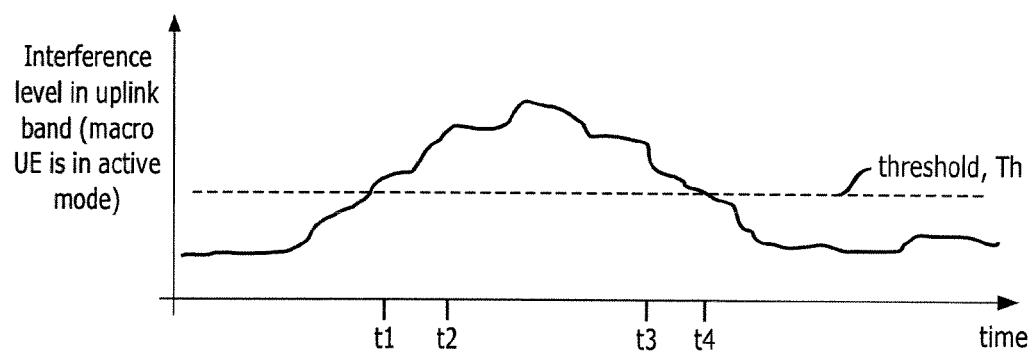
FIG. 4 is a diagram illustrating how interference level at the femtocell base station varies in the scenario shown in FIG. 3.

FIG. 4 is an example graph showing how the interference level in the uplink frequency band received by the femtocell base station varies over time as the user terminal moves.

As shown in FIGS. 3 and 4, the interference level in the uplink frequency band received by the femtocell base station increases as the user terminal 44 moves towards the femtocell, until, at a time t1, the femtocell base station reaches a position where the interference level exceeds the predetermined threshold Th. In consequence, the femtocell base station then ceases use downlink of that frequency band so as to prevent the user terminal experiencing unacceptable strong interference from the femtocell base station. Specifically, on that frequency band, pilot transmissions and data transmissions from the femtocell base station are stopped. More specifically, pilot transmissions are powered down and active call connected to the femtocell base station are handed over to the macrocell.

Incidentally, as the user terminal proceeds nearer to then passed the femtocell base station 30, although not call connected to the femtocell, the user terminal physically enters the femtocell at time t2 then leaves the femtocell at time t3.

At time t4 the interference level experienced by the femtocell base station 30, as determined by the interference level calculator 58 and threshold detector 60, is reduced to below the threshold Th. Accordingly, the user terminal is sufficiently far away that use is restarted, or is permitted to be restarted, downlink by the femtocell base station, of the frequency band being used downlink by the macrocell base station.

Detection of a User Terminal in Idle Mode Connection

Figure 5:
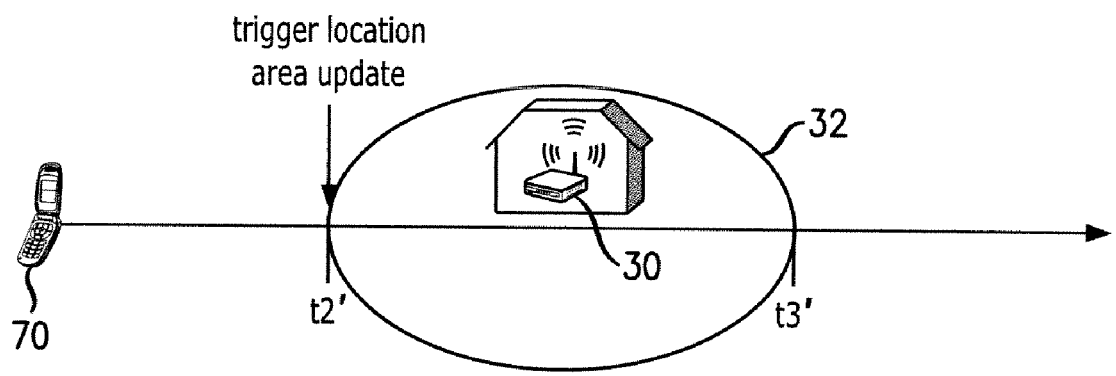
FIG. 5 is a diagram illustrating a scenario in which a user terminal that is in idle mode connection with a macrocell base station approaches the femtocell base station shown in FIG. 2.

As shown in FIG. 5, consider a user terminal 70 that is in idle mode connection with the macrocell base station, moving towards then through the femtocell 32. In this mode the user terminal does not transmit a signal that can be detected by the femtocell base station 30.

The femtocell base station 30 transmits pilot signals with a different location area code to the location area code of the macrocell. When the user terminal 70, which is in idle mode and does not have access to the femtocell base station 30 comes into range of pilot signals from the femtocell base station 30, specifically at t2' as shown in FIG. 5, the user terminal receives the pilot signal. As the pilot signal has a different location area code to that of the macrocell to which the user terminal is connected, the user terminals sends a request for idle mode connection including a location area update request to the femtocell base station 30. This request is for the location area code stored in the core network for the user terminal to be updated to become the location area code of the femtocell base station 30.

The request is received and processed by the previously-mentioned second detector 54 of the femtocell base station 30 as shown in FIG. 2, so as to detect the presence of the idle mode macrocell-connected user terminal 70. The user terminal 70 is, however, not permitted to establish idle mode connection to the femtocell base station, nor update its location area code to become that of the femtocell base station 30, because the user terminal is not on the list of permitted users of that femtocell. Incidentally, this has a benefit that signalling to or from the core network is not, in consequence, increased.

Instead, to prevent communications between macrocell base station and the user terminal being drowned by the femtocell base station's pilot and data transmissions, the reuse controller 62 of the femtocell base station 30 disables use by the femtocell base station of that frequency band temporarily. Accordingly, the user terminal does not experience a communications "deadzone".

The frequency band is disabled for a time interval set to approximately correspond to the time period when the user terminal is in the femtocell 32, namely the period between time t2' and t3' as shown in FIG. 5.

The time interval is dynamically adapted by the re-use controller 62 of the femtocell base station 30. If the time interval is too short, use of that frequency band by the femtocell base station is resumed before time t3' which would cause a repeat location area update request from the user terminal and consequential processing thereof to again disable use of that frequency band. The reuse controller notes such a repeat occurrence and so extends the time interval to be used for the next macrocell-connected idle mode user terminal that comes along. Conversely, if no such repeat occurrence is noted, the time interval to be used is decreased so as to keep the time interval near optimum.

If the femtocell base station 30 detects idle mode user terminals too frequently, use of the frequency band by the femtocell base station is disabled permanently to avoid unnecessary signalling and consequential power loss from those user terminals.

Variants

In the above example, the macrocell and femtocell use the same type of air interface technology, namely Universal Mobile Telecommunications System (UMTS) in this example, although in other embodiments other air interface technologies, such as Global System for Mobiles (GSM), WiFi, CDMA2000, Long Term Evolution (LTE) may be used.

Figure 6:
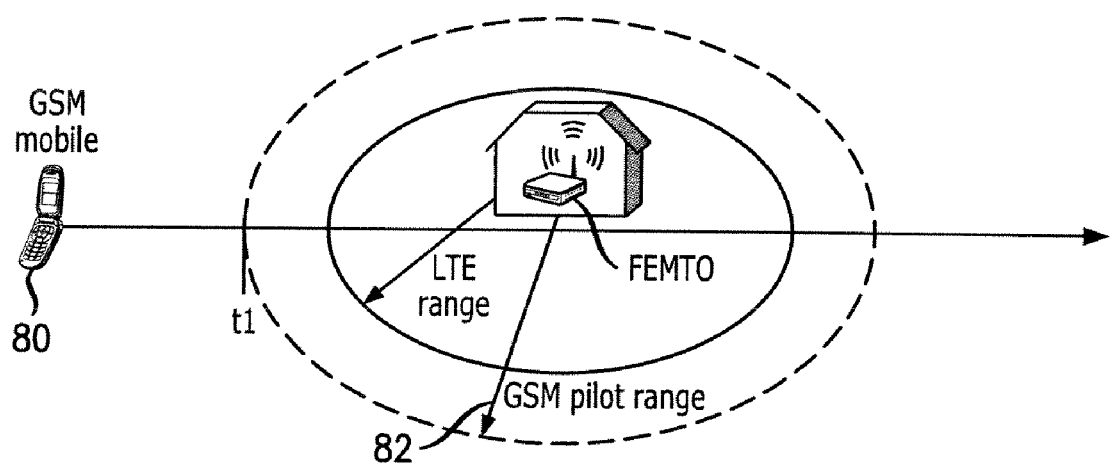
FIG. 6 is a diagram illustrating a scenario according to a second embodiment of the invention, in which the femtocell is of a different air interface technology to the macrocell.

In some alternative embodiments, the macrocell and femtocell air interface technologies are different. One example is shown in FIG. 6, where the femtocell is LTE, and the macrocell is GSM but is not LTE-capable. The user terminal is of GSM type.

In this example shown in FIG. 6, the detection of an active mode user terminal, based on detecting interference level, as described above, still works. On the other hand, as regards a user terminal in idle mode, detection of the user terminal relies on user terminal signalling to the femtocell, which requires that the user terminal receive a pilot signal from the femtocell base station, the pilot signal being in a format that the user terminal can decode. Accordingly, an additional, separate, pilot signal of a format that the user terminal can decode is transmitted by the femtocell. More specifically in this example, the femtocell transmits a GSM pilot signal in addition to the LTE pilot signal that the femtocell usually sends.

In this example shown in FIG. 6, the GSM pilot signal is transmitted at higher power that the LTE pilot signal in order to increase the range 82 in which user terminals are detected. As shown in FIG. 6, the user terminal 82 decodes the pilot signal from the femtocell base station at time t1, triggering the location area update request and consequential disabling of use of the frequency band by the femtocell base station. Accordingly use of that frequency band by the femtocell base station is disabled in a timely way, so as to prevent loss of connection to the macrocell base station due to interference from the femtocell base station.

Turning to another embodiment, which is an otherwise similar example to that described in relation to FIGS. 3 and 4 above, rather than ceasing downlink use completely of that frequency band by the femtocell base station, the power of transmissions from the femtocell base station in that frequency band is instead reduced significantly so that significant interference to the macrocell-connected user terminal is avoided. In other words, the femtocell coverage area is reduced so that the user terminal becomes located outside of the femtocell coverage area. For example, coverage can be reduced so as to basically still cover the home or office in which the femtocell base station is situated but no longer cover neighbouring areas such as a garden or street.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of radio communication in a radio communications network comprising a macrocell base station and a femtocell base station, the method comprising:
   the femtocell base station transmitting in a first radio frequency band that is allocated to the macrocell;
   the femtocell base station detecting that a user terminal that is connected to the macrocell base station is in the femtocell; and
   the femtocell base station in response to said detecting that the user terminal is in the femtocell, ceasing to use frequency band at least in the region in which the user terminal is located so as to avoid unacceptable interference to the user terminal; and
   wherein the first radio frequency band use by the femtocell base station is stopped for a predetermined time interval upon the user being identified as being in the femtocell; and
   wherein the first radio frequency band use by the femtocell base station is restarted after said time interval, and upon the user terminal being identified as still in the femtocell use of the first frequency band is ceased again and the time interval to be used subsequently is extended.

2. A method according to claim 1, in which the femtocell base station is only permitted to connect to registered user terminals, and the user terminal that is connected to the macrocell base station is not registered so cannot be connected to the femtocell base station.

3. A method according to claim 1, in which the ceasing to use the first radio frequency band at least in the region in which the user terminal is located is ceasing to use the first radio frequency band by the femtocell base station anywhere in the femtocell.

4. A method according to claim 1, in which the ceasing to use the first radio frequency band at least in the region in which the user terminal is located is by reducing transmission power so as to shrink the femtocell to an extent that the user terminal is thereby no longer covered by the femtocell.

5. A method according to claim 1, wherein when the user terminal is in active mode call-connection to the macrocell base station, the femtocell base station monitors the level of interference in the first radio frequency band, and detects the user terminal as being in the femtocell upon the level of interference exceeding a predetermined threshold.

6. A method according to claim 5, in which the first radio frequency band is not used by the femtocell base station while the level of interference is monitored as being above the threshold.

7. A method according to claim 1, wherein when the user terminal is in idle mode connection to the macrocell base station, the femtocell base station transmits a pilot signal identifying the femtocell, receives a responsive request from the user terminal to connect to the femtocell base station, and the femtocell receives the responsive request to thereby the user terminal as being in the femtocell.

8. A method according to claim 1, in which the first radio frequency band use by the femtocell base station is restarted, and upon the user terminal being identified as no longer in the femtocell the time interval to be used subsequently is reduced.

9. A method according to claim 1, in which the femtocell base station is of a first type of access technology and the macrocell base station is of a second type of access technology, the femtocell base station transmits a pilot signal according to the first type of access technology for reception by user terminals registered with the femtocell base station and transmits a pilot signal according to the second type of access technology for reception by the user terminal connected to the macrocell base station.

10. A method according to claim 9, in which the first type of access technology is one of Long Term Evolution (LTE), Universal Mobile Telecommunications System (UMTS), Global System for Mobiles (GSM), and WiMax, and the second type of access technology is another one of Long Term Evolution (LTE), Universal Mobile Telecommunications System (UMTS), Global System for Mobiles (GSM), and WiMax.

11. A femtocell base station for radio communications comprising:
   a transmitter configured to transmit in a first radio frequency band;
   a detector configured to detect that a user terminal that is connected using the first radio frequency band to a macrocell base station has entered the femtocell; and
   a controller configured to respond to an indication from the detector that the user terminal is in the femtocell by controlling the transmitter so as to cease to use the first radio frequency band at least in the region in which the user terminal is located so as to avoid unacceptable interference to the user terminal;
   wherein the femtocell base station stops use of the first radio frequency band for a predetermined time interval upon the user being identified as being in the femtocell; and
   wherein the femtocell base station restarts use of the first radio frequency band after said time interval. and again ceases use of the first radio frequency ban upon the user terminal being identified as still in the femtocell and subsequently extends the time interval to be used.

12. A femtocell base station according to claim 11, in which the femtocell base station comprises, for use in the detecting upon the user terminal being in active mode, a threshold detector configured to compare level of received interference in the first frequency band to a predetermined threshold, and in which the femtocell base station also comprises, for use in the detecting upon the user terminal being in idle mode, an idle mode detector configured to process a request from the user terminal to connect to the femtocell base station.

13. A femtocell base station according to claim 11, in which the femtocell base station restarts use of the first radio frequency band, and upon the user terminal being identified as no longer in the femtocell, and subsequently reduces the time interval to be used.

14. A femtocell base station according to claim 11, in which the femtocell base station ceases to use the first radio frequency band at least in the region in which the user terminal is located by ceasing to use the first radio frequency band anywhere in the femtocell.

15. A femtocell base station according to claim 11, in which the femtocell base station ceases to use the first radio frequency band at least in the region in which the user terminal is located by reducing transmission power so as to shrink the femtocell to an extent that the user terminal is thereby no longer covered by the femtocell.

16. A femtocell base station according to claim 11, wherein when the user terminal is in active mode call-connection to the macrocell base station, the femtocell base station monitors the level of interference in the first radio frequency band, and detects the user terminal as being in the femtocell upon the level of interference exceeding a predetermined threshold.

17. A femtocell base station according to claim 16, in which the femtocell base station does not use the first radio frequency band while the level of interference is monitored as being above the threshold.

18. A femtocell base station according to claim 11, wherein when the user terminal is in idle mode connection to the macrocell base station, the femtocell base station transmits a pilot signal identifying the femtocell, receives a responsive request from the user terminal to connect to the femtocell base station, and the femtocell receives the responsive request to thereby identify the user terminal as being in the femtocell.

19. A femtocell base station according to claim 11, in which the femtocell base station is of a first type of access technology and the macrocell base station is of a second type of access technology, the femtocell base station transmits a pilot signal according to the first type of access technology for reception by user terminals registered with the femtocell base station and transmits a pilot signal according to the second type of access technology for reception by the user terminal connected to the macrocell base station.

20. A femtocell base station according to claim 19, in which the first type of access technology is one of Long Term Evolution (LTE), Universal Mobile Telecommunications System (UMTS), Global System for Mobiles (GSM), and WiMax, and the second type of access technology is another one of Long Term Evolution (LTE), Universal Mobile Telecommunications System (UMTS), Global System for Mobiles (GSM), and WiMax.

* * * * *